J. DISTER.
TRANSPARENT WALLED CONTAINER AND PROCESS OF MAKING SAME.
APPLICATION FILED FEB. 15, 1918.

1,356,344. Patented Oct. 19, 1920.

Inventor
Joseph Dister
By Munday Clarke & Carpenter
Attorneys

UNITED STATES PATENT OFFICE.

JOSEPH DISTER, OF HAMILTON, OHIO, ASSIGNOR TO AMERICAN CAN COMPANY, OF NEW YORK, N. Y., A CORPORATION OF NEW JERSEY.

TRANSPARENT-WALLED CONTAINER AND PROCESS OF MAKING SAME.

1,356,344.            Specification of Letters Patent.      Patented Oct. 19, 1920.

Original application filed December 1, 1913, Serial No. 803,874. Patent No. 1,309,615, dated July 15, 1919. Divided and this application filed February 15, 1918. Serial No. 217,349.

*To all whom it may concern:*

Be it known that I, JOSEPH DISTER, a citizen of the United States, residing in Hamilton, in the county of Butler and State of Ohio, have invented a new and useful Improvement in Transparent-Walled Containers and Processes of Making Same, of which the following is a specification.

This invention is a division of Patent No. 1,309,615, granted July 15, 1919, on my application Serial No. 803,874, filed December 1, 1913, for transparent sided curved walled vessels and relates to an improvement in the art of transparent sided walled vessels.

The purpose broadly of the invention is the provision of a vessel of sheet metal having an inset, flexible, transparent window seamed in place, the invention contemplating the positioning of the flexible, transparent window or inset in the sheet metal blank before it is formed into a vessel, in order that the production may be expedited and the vessel be provided without requiring delicate and difficult operations upon the metal body sheet after it has been curved or formed.

Figure 1:
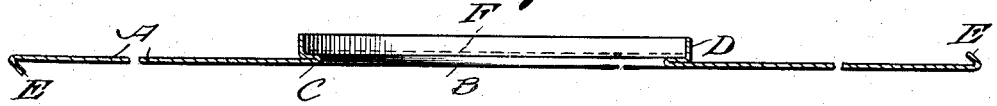
Figure 2:
Figure 3:
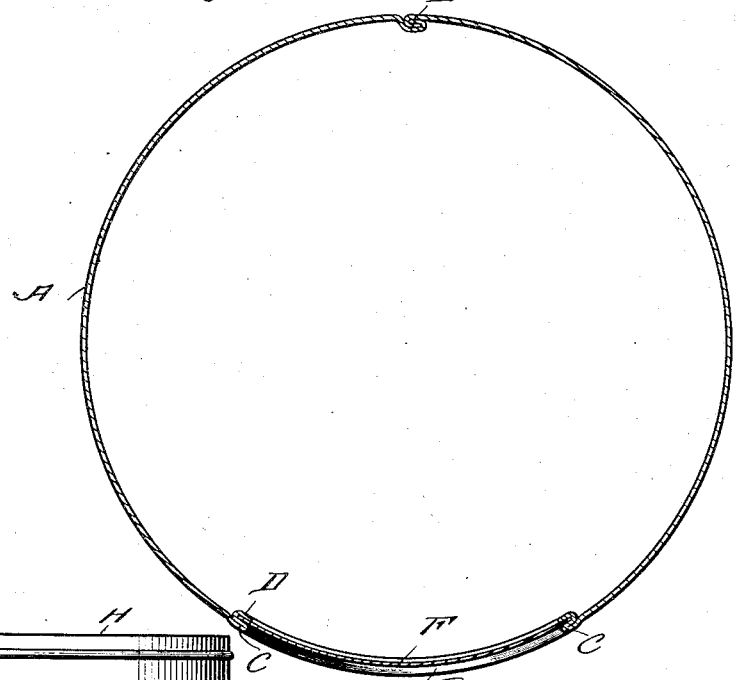
Figure 4:
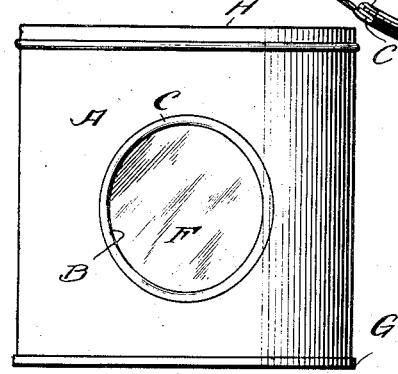

In the accompanying drawing are shown various stages of the body sheet in the course of its formation into the finished vessel, and in these drawings Figure 1 is a section of the sheet metal vessel wall shown in the flat and formed with an aperture having shouldered edges ready to receive the flexible, transparent sheet; Fig. 2 is a similar section with the flexible, transparent sheet added and showing the shouldered edges turned down solidly upon said transparent sheet; Fig. 3 is a similar sectional view of the composite wall showing the same curved into form and its ends united by a side seam; and Fig. 4 is a view of the completed vessel.

Heretofore, the worker in sheet metal, in the manufacture of a large line of articles, like cracker boxes, candy boxes and display boxes in general, that are provided with a transparent side through which the contained goods may be seen, has felt obliged to make the vessel containing the transparent window with a flat portion for the reception of the glass, and this has generally resulted in such packages or vessels being made of rectangular form, involving the expense of manufacture incident to such rectangular form and relatively greater than the cost of making the cylindric or curved form of vessel. The pane of glass usually employed was positioned after the body of the vessel was completed, which procedure necessitated either the use of complicated, delicate machinery or the provision of grooved or other holding members for the pane.

In accordance with my present invention the transparent inset, which is preferably of bendable character, is secured in a sheet in the flat and is seamed in place by ordinary seaming devices. It will be manifest, however, that while the invention has for one of its objects the provision of a curved walled vessel, it may also be used for the provision of a vessel of rectangular square or other shape.

In the said drawing, A is a flexible sheet of tin, such as is ordinarily used in the manufacture of tin cans and sheet metal ware. This blank, while in the flat, is perforated with a large window aperture B, the edges of which are folded outwardly to form the double thickness C, and the shoulder flange D. The ends of this blank are formed with the usual hooks E, E, to unite them together. While thus still in the flat a transparent sheet of flexible material F, as for example transparent celluloid cut to the right form and size, is laid into the seat formed by the shoulder flange D, and said shoulder flange is then turned down solidly upon it, after which the sheet is in such condition that it may be and is curved into the form shown at Fig. 3 of the drawing, the ends of the sheet being seamed together to form the body of the vessel which is afterward provided with a bottom G and top H.

The blank, flat sheet, provided with its flexible transparent portion flatly seamed to it, as above described, is in condition to be and is treated by processes of manufacture the same as though it contained no transparent window, which fact greatly cheapens the cost. And the finished article is cheap, strong, and much less liable to breakage than the ordinary rectangular transparent sided sheet-metal vessel.

It will be noted that owing to the nature of the transparent, flexible material, preferably celluloid, and to the method of securing the same in the sheet metal wall— by pressing the shoulder flange down firmly upon the celluloid held between said flange and a firm seat—it is possible to make the joint between the sheet metal and the celluloid water-tight and moisture-proof, and such joint is so made in practice.

I claim:

1. The art of making transparent sided sheet-metal vessels which consists in first making the sheet metal wall of the vessel in the flat, and while in the flat providing said wall with a flexible sheet of transparent material, and secondly thereafter curving said wall and said transparent sheet into shape as a whole and providing it with a bottom and top, substantially as set forth.

2. The art of making transparent sided sheet-metal vessels, which consists in first perforating the body blank and while in the flat securing a flexible sheet of transparent material in the perforation thus formed, and then forming the body wall and bending said transparent material and wall into the desired shape as a whole and subsequently providing it with a top and bottom.

3. The art of making vessels having a transparent inset, which consists in providing a transparent inset in the body sheet in the flat and thereafter forming said body sheet and bending said transparent inset, into the form of the vessel.

4. A vessel comprising a sheet metal wall provided with an inset sheet of flexible, transparent material, said sheet metal wall being formed with seam flanges which embrace the edge of said transparent sheet, and said sheet metal wall and transparent sheet being both bent into the final form of the vessel.

Signed in the presence of two subscribing witnesses.

JOSEPH DISTER.

Witnesses:
MAUD F. HOOPER,
HILDA LUKENS.